United States Patent Office 3,395,097
Patented July 30, 1968

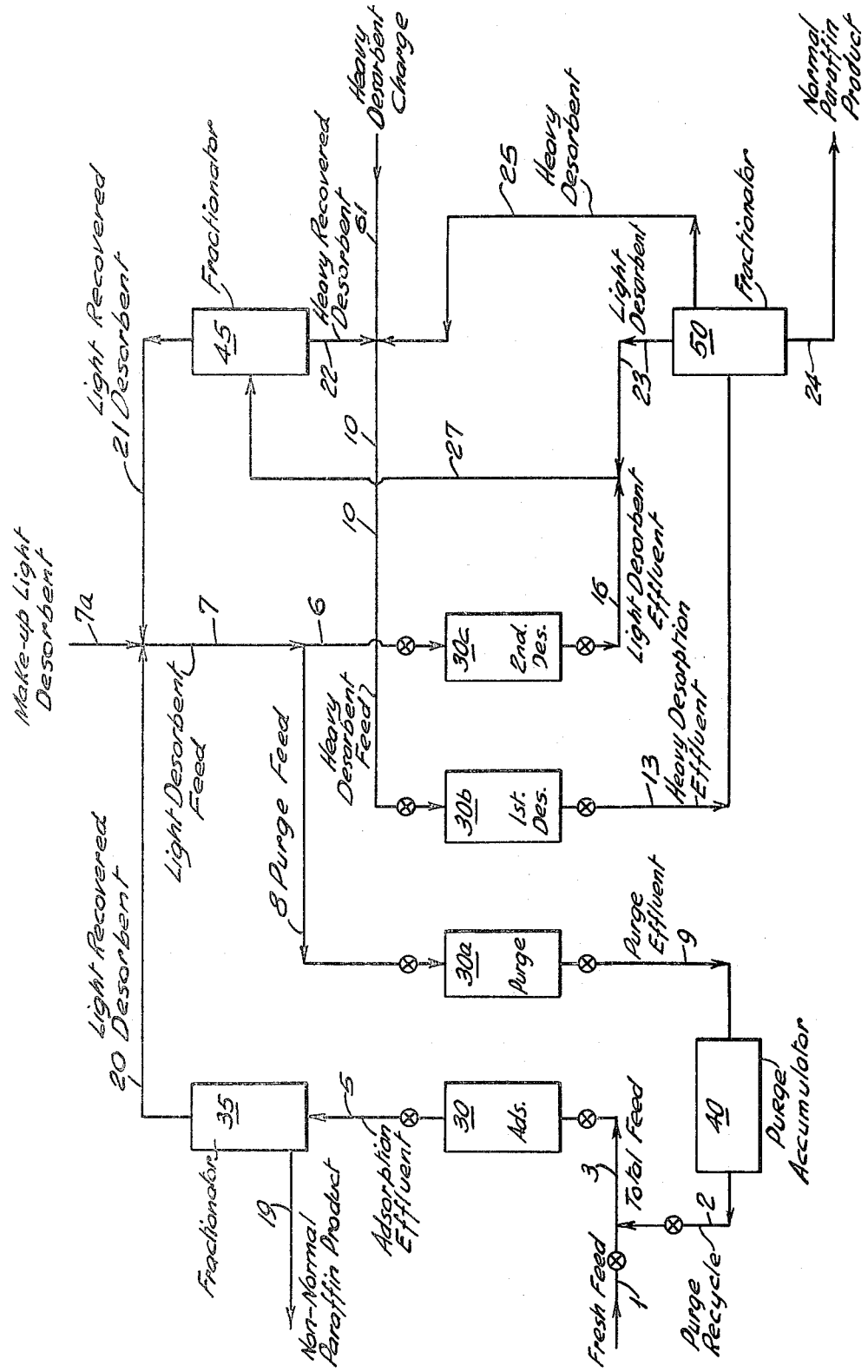

3,395,097
DESORBING HYDROCARBONS FROM A MOLECULAR SIEVE WITH TWO DIFFERENT DESORBING MEDIUMS
Charles A. Senn III, Groves, Tex., assignor to Texaco Inc., New York, N.Y., a corporation of Delaware
Filed June 28, 1966, Ser. No. 561,182
13 Claims. (Cl. 208—310)

ABSTRACT OF THE DISCLOSURE

A vapor phase method of desorbing high molecular weight straight chain hydrocarbons from the pores of a molecular sieve selective adsorbent by contacting the sieve with a first desorbing medium to remove therefrom the adsorbed straight chain hydrocarbons and adsorbing some of the first desorbing medium, then removing the adsorbed first desorbing medium from the sieve with a second desorbing medium comprising a straight chain hydrocarbon having 1 to 4 carbon atoms less than the lightest straight chain hydrocarbon of the feed mixture or of the first desorbing medium.

---

The present invention relates to a method of separating straight chain hydrocarbons from a mixture thereof with non-straight chain hydrocarbons. More particularly, the present invention is directed to an improved method of separating straight chain hydrocarbons especially relatively high molecular weight straight chain hydrocarbons in the range of from about $C_{10}$ to about $C_{24}$ carbon atoms from a mixture of such hydrocarbons with non-normal hydrocarbons of corresponding chain length in the vapor phase at an elevated temperature and superatmospheric pressure using a molecular sieve selective adsorbent of Type 5A structure as the adsorbing medium.

It is known, for example, from Hess et al. U.S. 2,859,856, that molecular sieve selective adsorbents such as those disclosed in U.S. 2,882,243 can be used in separating straight chain hydrocarbons from mixtures thereof with non-straight chain hydrocarbons by adsorbing the straight chain components of the mixture in the pores of the selective adsorbent. It is also known, for example, from Ballard et al. U.S. 2,818,455, that the straight chain hydrocarbons adsorbed on the molecular sieve selective adsorbent can be desorbed therefrom using a gaseous hydrocarbon desorbing medium containing at least 3 carbon atoms per molecule.

The known selective adsorbent processes for the separation of straight chain hydrocarbons from hydrocarbon mixtures have been generally applied to up-grade petroleum fractions in the naphtha boiling range. These processes generally comprise an adsorption step and a desorption step which are carried out at various temperatures and pressures including sub- and superatmospheric pressures.

The present invention is directed to an improved method of separating straight chain hydrocarbons from mixtures thereof with non-straight chain hydrocarbons.

The improved method of the present invention broadly comprises a combination of steps comprising an adsorption step, a depressuring step, a purge step, a repressuring step and a first desorption step and a second desorption step. More specifically, the method of the present invention comprises an adsorption step wherein at an elevated temperature and superatmospheric pressure a vapor phase mixture of $C_{10}$–$C_{24}$ straight chain and non-straight chain including cyclic hydrocarbons is contacted with a molecular sieve selective adsorbent to adsorb the straight chain hydrocarbon components of the mixture therefrom in the pores of said adsorbent; the adsorption step is terminated; a depressuring step wherein the pressure of the adsorption step is reduced to a value below that employed in the adsorption step; the depressuring step is discontinued; a purge step wherein the laden adsorbent is contacted with a straight chain hydrocarbon in vapor phase to remove surface-adsorbed hydrocarbons and hydrocarbons in the void spaces of the bed therefrom; the purge step is discontinued; a repressuring step wherein the sieve bed pressure is increased to a value greater than the pressure of the adsorption step; repressurization is terminated; a first desorption step wherein the adsorbed straight chain hydrocarbons from the selective adsorbent are desorbed with a first desorbing medium comprising at least one straight chain hydrocarbon having a carbon number in the range of the first five carbon numbers of the feed $C_{10}$–$C_{24}$ hydrocarbon mixture to remove some of said adsorbed straight chain hydrocarbons and concomitantly adsorbing some of the straight chain hydrocarbon components of the first desorbing medium, and in a second desorbing step contacting said selective adsorbent with a second desorbing medium comprising a vaporized straight chain hydrocarbon having a carbon number in the range of 1 to 4 carbon atoms less than the carbon number of the lightest straight chain hydrocarbon component of said feed hydrocarbon mixture or the said first desorbing medium to remove the adsorbed straight chain hydrocarbons of the first desorbing medium from said selective adsorbent, terminating the second desorption step and repeating said operation in sequence.

The expression "surface-adsorbed hydrocarbons" as used hereinabove includes all adsorption on the sieve other than in the sieve cages (within the zeolite crystal). The expression includes all the non-normal compounds adsorbed in the macro-pores of the sieve (inter-crystalline pores) as well as those adsorbed on the surface thereof.

The method of the present invention is particularly adaptable to the production of relatively high molecular weight straight chain hydrocarbons in excellent yields in a rapid, efficient and economical manner.

Accordingly, it is an object of the present invention to provide an improved hydrocarbon treating process. A further object is to provide an improved method of producing relatively high molecular weight straight chain hydrocarbons in a high degree of purity in commercially attractive yields from mixtures of such hydrocarbons and non-straight chain hydrocarbons. A still further object is to provide an improved cyclic straight chain hydrocarbon separation process which is conducted in a relatively short period of time.

How these and other objects of this invention are accomplished will become apparent with reference to the accompanying disclosure. In at least one embodiment of the invention at least one of the foregoing objects will be achieved.

By the term "straight chain" hydrocarbons is meant any aliphatic or acyclic or open chain hydrocarbon which does not possess side chain branching. Representative straight chain hydrocarbons are the normal paraffins and the normal olefins, mono- or polyolefins, including the straight chain acetylenic hydrocarbons. The "non-straight chain" hydrocarbons comprise the aromatic and naphthenic hydrocarbons as well as the isoparaffinic, isoolefinic hydrocarbons and the like.

Petroleum fractions for which the present invention are particularly adaptable include the kerosene and gas oil fractions as well as mixtures thereof. A typical hydrocarbon fraction which may be treated for the removal of the straight chain hydrocarbon components therefrom might have in the case of a kerosene fraction a boiling point in the range of about 330 to 545° F. and may contain a substantial amount of straight chain hydrocarbons, e.g. 15.0 to 25.0% by weight or more. The choice of the particular petroleum fraction to be employed in the method of the present invention is dependent on the carbon number range of the desired end product as well as on the straight chain hydrocarbon content of the petroleum fraction.

In the practice of this invention a molecular sieve selective adsorbent which is capable of adsorbing the straight chain hydrocarbon components of the hydrocarbon mixture to be separated is required. A particularly suitable molecular sieve selective adsorbent for straight chain hydrocarbons is a calcium aluminosilicate, apparently actually a sodium calcium aluminosilicate, marketed by Linde Company, and designated Linde Molecular Sieve Type 5A or 5A-45. The crystals of this particular calcium aluminosilicate have a pore size or opening of about 5 A. units, a pore size sufficiently large to admit straight chain hydrocarbons, such as the normal paraffins and the normal olefins, to the substantial exclusion of the non-straight chain hydrocarbons, i.e., the naphthenic, aromatic, isoparaffinic and isoolefinic hydrocarbons. This particular type of molecular sieve selective adsorbent is available in various sizes, such as in the form of 1/8" or 1/16" diameter extrusions, or as a finely divided powder having a particle size in the range of 0.5–5.0 microns. In general, a selective adsorbent employed in the practice of this invention may be in any suitable form or shape, granular, spheroidal or microspheroidal.

The method of the present invention is designed for vapor phase operation and under essentially isothermal conditions. The particular operating conditions selected are dependent on the nature of the feed stream to the adsorption zone, the carbon number range of the feed stream and desired product stream as well as the carbon number distribution (relative amounts of each carbon number) within the range, the straight chain hydrocarbon content of the feed stream and the olefinic, sulfur, nitrogen and aromatic compounds content thereof. In general, the feed stream preferably should be relatively low in olefins, sulfur, nitrogen and aromatics content and these impurities can be readily reduced to acceptable limits or removed in a manner well known in the art such as by mild hydrogenation involving mild catalytic reforming. In addition, the feed stream should be relatively free from the lower molecular weight hydrocarbons such as in the range from about $C_1$–$C_9$ as such hydrocarbons complicate recovery of the gaseous materials employed in the desorption phase of the present invention.

In the accompanying drawing the single figure thereof illustrates a schematic flow diagram of the preferred method of carrying out the present invention.

In the drawing for brevity reference numerals 30, 30a, 30b, and 30c refer to different stages of a vessel.

In the drawing a vapor phase mixture of high molecular weight straight chain and non-straight chain hydrocarbons is charged by way of line 1 and line 3 into a lower end of an adsorption vessel 30 maintained at an elevated temperature and a superatmospheric pressure containing a bed of calcium sodium aluminosilicate molecular sieve selective adsorbent. In the adsorption vessel 30 the straight chain hydrocarbon components of the feed mixture are adsorbed by the selective adsorbent. From the outlet end of the vessel 30 there is withdrawn by way of line 5 an adsorption effluent stream containing the non-straight chain hydrocarbons of the feed, as well as the desorbed second (light) desorbing medium present in the sieve pores from a previous desorption step. The light desorption medium present in the adsorption effluent during the adsorption stage of the process is obtained from the previous cycle wherein during the second step of the desorption cycle, a portion of the desorbing medium employed in this stage is adsorbed by the sieve pores from which the adsorbed straight chain hydrocarbon components of the feed mixture have been removed. The adsorption vessel effluent is passed to a fractionator 35 and there is recovered therefrom a non-straight chain hydrocarbon product stream by way of line 19 which can be passed to a storage vessel not shown for use as a kerosene blending stock and a light recovered desorbent stream by way of line 20 which can be returned to light desorbent feed line 7.

At the completion of the adsorption step, hereinafter more fully described, the feed to adsorption vessel 30 is discontinued. In a depressuring step the vessel 30a is depressured to a reduced pressure by venting through line 9 and accumulator 40, the accumulator being maintained at about atmospheric pressure. When the selective adsorbent vessel 30a is at the selected lower pressure of the depressuring step, the purge step is begun. In the purge step a vaporized stream of light desorbent is fed to vessel 30a by way of lines 7 and 8 and passed therethrough in a direction countercurrent to the flow of the feed stream 3 into vessel 30. A purge effluent stream is withdrawn during the purge stage by way of line 9 and is passed to accumulator 40. From accumulator 40 the purge effluent stream is passed by way of line 2 to total feed line 3 and passed therethrough to adsorption vessel 30 during the next adsorption cycle. At the end of the purge step a repressuring step is begun.

In the repressuring step the flow of heavy desorbent is introduced into vessel 30a by way of lines 61 and 10 to increase the pressure in the vessel to the selected desorbing pressure. When the selected pressure is obtained in vessel 30a, the first desorption step is begun.

In the first step of the desorption cycle, a heavy desorbing medium (first desorbent) in the vaporized state obtained by way of make-up line 61 and recycle heavy desorbent from lines 25 and 22 is introduced by way of line 10 into adsorption vessel 30b. The flow of the heavy desorbing medium into vessel 30b is also countercurrent to the feed flow during the adsorption step.

The resulting first desorption effluent comprising the desorbed high molecular weight straight chain hydrocarbons of the feed, some heavy desorbing medium and some light desorbing medium from the preceding purge step is withdrawn from the vessel 30b by way of line 13 and passed therethrough to fractionator 50. From fractionator 50 there is recovered a high molecular weight straight chain hydrocarbon product stream by way of line 24, a heavy desorbent stream by way of line 25, which is passed to the heavy desorbent feed line 10, and a light desorbent stream by way of line 23 which is passed to the light desorption effluent line 27. At the termination of the first step of the desorption operation, the flow of the heavy desorbent feed into the vessel 30b is discontinued.

There is then introduced into the vessel 30c by way of lines 7 and 6 in a second desorption step a light desorbent stream in the vaporized state to remove the straight chain components of the heavy desorbent feed stream which were adsorbed in the pores of the molecular sieve selective adsorbent during the first step of the desorption cycle. During the second step of the desorption operation there is recovered from vessel 30c a light desorption effluent stream comprising the adsorbed heavy desorbing medium and some light desorption medium by way of line 16 which is passed therethrough and through line 27 to fractionator 45. From fractionator 45 there is recovered a light desorbent stream by way of line 21 which can be returned to the light desorbent feed line 7, and recovered heavy desorbent which is returned by way of line 22 to heavy desorbent feed line 10.

At the termination of the second step of the desorption operation, vessel 30c is depressured through the adsorption effluent line 5 and into fractionator 35 to attain the lower pressure used in the adsorption step and the entire cycle is repeated by reintroducing an additional quantity of fresh feed into vessel 30 by way of lines 1 and 3.

The adsorption step in the process of the present invention is carried out with the feed stream being in the vapor phase.

The particular adsorption temperature used varies with the type of charge stock, carbon number content thereof and desired range of the straight chain hydrocarbons to be recovered from the charge stock. However, it is necessary to carry out the adsorption step at a temperature above the dewpoint of the vaporized feed stream to minimize surface adsorption of the non-straight chain hydrocarbons on the selective adsorbent and also to decrease the hold up of the charge stock in the sieve voids. A further requirement, which controls the upper temperature limit of the adsorption step, is the need to avoid cracking of the charge stock. Keeping in mind these lower and upper temperature limitations, it has been found that a temperature range of about 575 to about 700° F. in the adsorption step will permit satisfactory operations. A preferred temperature range for the adsorption step is from about 620° F. to about 660° F.

In the adsorption step, the adsorption vessel should be maintained at a positive pressure above atmospheric pressure to permit the selective adsorbent to adsorb an additional quantity of the straight chain hydrocarbon components of the feed during the adsorption step. It has been found that by maintaining the adsorption vessel at a pressure of between 10 and 70 p.s.i.g. during the adsorption step affords good results in terms of rapid adsorption of the adsorbable components of the feed by the selective adsorbent.

The charge stock is introduced into the adsorption vessel at a selected rate, and the feed is continued until the selective adsorbent is substantially saturated with normal straight chain hydrocarbon components of the feed. On attaining substantial saturation of the selective adsorbent by the straight chain hydrocarbon components of the feed, the adsorption step is terminated.

Following termination of the adsorption step, the adsorption vessel is depressured in a depressuring step to a lower pressure than the pressure used in the adsorption step. This depressuring step is required to remove some of the surface adsorbed non-straight chain hydrocarbons from the selective adsorbent and to also begin to remove from the adsorption vessel, particularly from the void spaces between the selective adsorbent, some of the unadsorbed portion of the charge stock while minimizing the loss of the adsorbed straight chain hydrocarbons from the sieve pores.

The depressuring step is terminated when the sieve bed pressure has been decreased to about 5–10 p.s.i.g. It is to be noted that the depressuring step is carried out at substantially the same temperature as was employed during the adsorption step.

Following termination of the depressuring step, a purge step is begun using as the purge medium a vaporized stream of light desorbent material hereinafter more fully described. The purge step is carried out at substantially the same temperature as the adsorption and depressuring steps, and the reduced pressure attained in the depressuring step. In this purge step a stream of the vaporized light desorbing medium is introduced into the adsorption vessel in a direction countercurrent to the flow of the charge stock thereto. The purge medium removes the remaining portion of the charge stock from the adsorption vessel and also the surface adsorbed non-straight chain hydrocarbon components from the selective adsorbent. In the purge step it is necessary to maintain the purge medium in the vaporized state for efficient operation and the flow rate thereof at a value between about 0.2 and 3.0 purge volumes to minimize removal of the pore adsorbed straight chain hydrocarbon components of the feed stream and to maximize removal of the surface adsorbed and the bed-entrapped, undesirable components. The term "purge volume" refers to the amount of the purge medium in the purge effluent stream per cycle and is equivalent to one vapor volume displacement (at purge conditions) of the total volume occupied by the sieve bed. Most efficient operations are conducted using a purge volume range of from 0.8 to 2.0 purge volumes when it is desired to attain very high straight chain hydrocarbon product purity. The effluent from the purge step comprising light desorbing medium, unadsorbed charge stock and surface adsorbed components of the charge stock together with some adsorbed straight chain hydrocarbons removed from the sieve pores by the purging medium is returned to the feed line to the adsorption vessel for use in a subsequent adsorption step as a supplemental charge. Routing of the purge effluent stream in this manner permits readsorption by the selective adsorbent of the straight chain hydrocarbon components that had been removed therefrom in the purging step. An additional advantage of this step is that the desirable straight chain hydrocarbons in the purge effluent stream are not lost in the process.

After completion of the purge step, the vessel is repressured to the desorption pressure which is advantageously about 1 to 20 p.s.i.g., and preferably about 5 to 15 p.s.i.g. above the highest pressure in the sieve vessel during the adsorption step. This repressuring step is necessary to permit more rapid desorption of the pore adsorbed straight chain hydrocarbon components from the selective adsorbent by the heavy desorbing medium in the first desorption step. The desorption pressure is attained by discontinuing the flow of the purge effluent stream to the purge accumulator 40 by way of line 9 and discontinuing the flow of purge medium into the selective adsorbent vessel by way of line 8. Then, the heavy desorbent is introduced into the sieve vessel by way of line 10, and the effluent line from the sieve vessel, line 13, remains blocked until the selected desorbing pressure is attained.

In the first desorption step in the desorption cycle, a heavy desorbing medium in the vaporized state is introduced into the adsorption vessel in a direction countercurrent to the flow of the fresh feed stream thereto to effect removal of the pore adsorbed straight chain hydrocarbon components of the feed stream from the selective adsorbent. In addition, the adsorbed straight chain components of the light desorbing medium which were adsorbed by the selective adsorbent during the purge step, and the residual light desorbing medium present in the sieve bed voids are removed from the sieve pores. The resulting heavy desorption effluent comprising a mixture of the desorbed $C_{10}$–$C_{24}$ straight chain hydrocarbons of the feed, light desorbing medium, and the heavy desorption medium is recovered from the adsorption vessel and then fractionated to recover separate product streams of the straight chain hydrocarbon components of the feed, heavy desorbent medium and light desorbent medium.

In the first step of the desorption cycle, the heavy desorbing medium employed comprises essentially a straight chain hydrocarbon having a carbon number in the range of the first five carbon numbers of the $C_{10}$–$C_{24}$ hydrocarbon feed stream or a mixture of said straight chain hydrocarbons in said range.

At the termination of the first desorption step the selective adsorbent contains a minor amount (below 50%) of adsorbed $C_{10}$–$C_{24}$ straight chain hydrocarbons of the feed and a major amount (over 50%) of the straight chain hydrocarbon components of the first desorbing medium. The flow of the first desorbing medium into the adsorption vessel is discontinued.

In the second desorption step the second (light) desorbing medium comprising essentially a straight chain hydrocarbon having a carbon number in the range of 1 to 4 carbon atoms less than the lightest straight chain component of the feed or the first desorbing medium is charged into the adsorption vessel countercurrent to the flow of fresh feed thereto. There is recovered a second desorption effluent mixture comprising a major amount (over 50%) of light desorbing medium and a minor amount (below 50%) of heavy desorbing medium. The heavy desorbing medium component obtained in this second desorption effluent comprises that portion of the first desorbing medium adsorbed in the sieve pores in the first desorption step.

The light desorbing medium charged in this second desorption step displaces the heavy desorbing medium from the sieve pores and in turn some portion thereof is itself adsorbed in the vacated sieve pores.

The second desorption effluent is fractionated and there is separately recovered a heavy desorbing effluent stream and a light desorbing effluent stream for reuse in the desorption steps.

The method of the present invention utilizes a two-step desorption cycle so as to effect removal (desorption) of the adsorbed $C_{10}$–$C_{24}$ straight chain hydrocarbon components of the feed in a rapid, efficient manner not heretofore attainable by prior methods.

In the first desorption step, using a heavy desorbing medium having a carbon number in the range of the first five carbon numbers of the hydrocarbon feed stream or a desorbent mixture of such straight chain hydrocarbons permits a material reduction in desorption time. For example, a Linde 5A–45 molecular sieve adsorbent containing the straight chain hydrocarbon components of $C_{10}$–$C_{18}$ hydrocarbon mixture can be desorbed to the extent of about 75% using a desorbing medium flow rate of 1.5 LHSV with n-heptane in about 31.0 minutes and with a n-octane hydrocarbon in about 24.0 minutes. In contrast, using the two-step desorption technique of the present invention, i.e. n-decane heavy desorbing medium and n-heptane light desorbing medium, the total desorption time is 15.0 minutes. Using a combination of n-decane heavy desorbing medium and n-octane light desorbing medium the desorption time is 14.3 minutes and using a combination of n-dodecane desorbing medium and n-heptane desorbing medium the time for 75% desorption was 17.3 minutes. These two desorption step desorption times are about 50% on an average of the time required for an n-heptane desorbing medium and about 33% on an average of the time required for a n-octane desorbing medium.

The method of the present invention possesses similar advantages over separately processing a $C_{10}$–$C_{15}$ hydrocarbon fraction using a n-heptane desorbing medium and a $C_{15}$–$C_{18}$ hydrocarbon fraction using a mixed $C_{10}$–$C_{11}$ straight chain desorbing medium. A desorption time of 11 minutes was needed for a n-heptane desorbing medium (75% desorption) when processing a $C_{10}$–$C_{15}$ hydrocarbon fraction and 26.9 minutes was needed for the mixed n-decane-n-undecane desorbing medium when processing a $C_{15}$–$C_{18}$ hydrocarbon fraction.

A still further advantage of the method of the present invention over either of the above prior methods, i.e. a single desorbing medium or separate processing of the light and the heavy portions of the hydrocarbon charge stock is in the sieve utilization. The sieve utilization is calculated as the pounds of straight chain hydrocarbons produced per day per pound of sieve used. In the method of the present invention the sieve utilization rate was found to be 1.123 whereas using a single desorbent, i.e. n-heptane, the rate was 0.843. The separate processing sequence, blocked out operations, had a combined sieve utilization rate of 0.956. Thus, by the method of the present invention, the overall production rate can be increased by about ⅓ over the single desorption technique and by about 17.5% over the separate processing procedure with the result that more feed stock can be treated and desirable product streams obtained per day.

In the first desorption step of the present invention, the flow of desorbing medium into the adsorption zone is countercurrent to the fresh feed charge which preferably is upflow. By operating in this manner the lighter straight chain hydrocarbon components of the charge adsorbed in the pores of the adsorbent during the adsorption step are first desorbed, and, in turn, they assist the desorbing medium in desorbing of the adsorbed heavier straight chain hydrocarbon components nearer to the desorption outlet end of the vessel.

Termination of the first desorption step short of essentially complete removal of adsorbed straight chain hydrocarbons from the sieve pores permits the time of desorption to be materially decreased, i.e. in the order of 25–80%. Moreover the throughput of the charge can be materially increased with the result that more charge stock can be treated per operating day and more product can be obtained.

In the method of the present invention the first desorption step is terminated when from about 10 to 30% by weight of the pore adsorbed straight chain hydrocarbon components of the adsorption feed stream remain adsorbed in the pores of the molecular sieve. Ending the first desorption step period when from about 20 to 30% by weight of the straight chain hydrocarbon components remain in the sieve pores is particularly advantageous in the method of the present invention since the resultant savings in reduction of desorption time more than offsets the apparent inefficiency in desorption.

In the second desorption step, the removal of the admixed portion of the heavy desorbing medium from the sieve pores is carried out to the extent of removing at least 90% by weight of the adsorbed heavy desorbing medium and most effectively to remove at least about 97% by weight of the adsorbed heavy desorbing medium from the sieve pores while effecting removal of little, if any, of the pore adsorbed straight chain hydrocarbon components of the feed remaining in the sieve.

An effective combination is to remove only about 74–76% of the bore adsorbed straight chain hydrocarbon components of the charge to the adsorption vessel during the first desorption step and in the second desorption step to remove from 98 to 100% of the pore adsorbed heavy desorbing medium.

At the termination of the desorption step, the adsorption vessel is depressured to the adsorption pressure and the cyclic operation is repeated.

While the above detailed description of the process of the present invention has referred to a single vessel operation for simplicity, it is within the purview of the invention to produce same on a multi-vessel basis, wherein one or more separate vessels are used in each of the main process steps, i.e. adsorption, purge and desorption while another set of vessels are on a regeneration cycle. Periodic regeneration of the selective adsorbent is needed to restore the activity thereof after use in the process for an extended processing period. Suitable regeneration techniques known in the art such as, for example, the process disclosed in the Carter et al. U.S. Patent 2,908,639 can be used.

The process of the present invention is essentially a timed cyclic process. It has been found that satisfactory results have been achieved if the adsorption step is accomplished in about one-half of the total processing time, the remaining one-half being taken up by the balance of the processing steps, e.g. depressure, purge, repressure, both desorption steps. In general in processing $C_{10}$–$C_{18}$ type charge stocks to recover the straight chain hydrocarbon components thereof it has been found that the following time sequence is advantageous: adsorption, 18 minutes; depressure-purge, 3.0 minutes; repressure 0.50 minute; first desorption, 9 minutes; second desorption, 6 minutes; for a total cycle time of about 36 minutes.

In the method of the present invention it is particularly advantageous to control the various valves shown in the drawing in the following manner:

In the adsorption step the valves in lines 3 and 5 are opened and the valves in lines 8, 9, 10, 13, 6 and 16 are in the closed position. In the depressuring step following the adsorption step, the valves in lines 3 and 5 are closed and the valve in line 9 is opened. In the purge step the valve in line 8 is opened and the valve in line 9 remains opened. In the repressuring step the valves in lines 8 and 9 are closed and the valve in line 10 is opened.

In the first desorption step the valve in line 13 is opened and the valve in line 10 remains opened.

In the second desorption step the valve in lines 6 and 16 are opened and the valves in lines 10 and 13 are closed.

In carrying out the process of the present invention it has been found advantageous to employ a two sieve case system wherein one sieve case is on the adsorption cycle and the remaining case is on the purge and desorption steps cycle (i.e. includes depressure, purge, repressure and desorption).

Following is a description by way of examples of a method of carrying out the process of the present invention.

Example I

A mixed petroleum fraction at the rate of 524 barrels per hour comprising approximately 26.2% by weight of hydrotreated kerosine, 38.9% by weight of unhydrotreated kerosine and 34.9% by weight of gas oil, having a boiling range of 365 to 595° F. and containing 17.6% by weight of $C_{10}$–$C_{21}$ straight chain hydrocarbons is charged upflow at a temperature of about 630° F. and a pressure of about 20 p.s.i.g. together with a purge recycle stream at the rate of 39 b.p.h. comprising 29.1% $C_{10}$–$C_{21}$ non-straight chain hydrocarbons, 23.1% $C_{10}$–$C_{21}$ straight chain hydrocarbons and 47.8% of light $C_7$ desorbent medium to the lower end of an adsorption vessel measuring 26 ft. by 13.8 ft. in diameter, having an internal volume of about 3387 cubic ft. and containing about 175,000 pounds of $\frac{1}{16}''$ extruded molecular sieve selective adsorbent sold under the trade name Linde 5A–45 molecular sieve, at a combined feed charge rate of 563 b.p.h. There is recovered from the other end of the vessel an adsorption effluent stream in an amount of 548 b.p.h. comprising 31,411 pounds per hour of normal heptane light desorbing medium and 124,251 pounds per hour of non-straight chain $C_{10}$–$C_{21}$ hydrocarbons. The recovered adsorption effluent is fractionated and there is separately recovered the following product streams: a normal heptane light desorbing stream in an amount of 20.2% by weight basis fresh feed, and a $C_{10}$–$C_{21}$ non-straight chain hydrocarbon stream in a yield of 79.8% basis fresh feed. In the adsorption vessel the selective adsorbent adsorbs the straight chain hydrocarbons from the feed to the extent that after 18 minutes on the adsorption cycle the adsorbent is substantially saturated with the straight chain hydrocarbon components. The feed into the adsorption vessel is then discontinued and the vessel depressured to a pressure of about 5 p.s.i.g. in a period of about 0.5 minute. After attaining the purge pressure, a purge stream of light desorbing medium in vapor phase and comprising 95% by weight of $C_7$ straight chain hydrocarbon, the balance being non-straight chain hydrocarbons, is passed into the adsorption vessel at a rate of 6,452 pounds per hour (26 b.p.h.). The purge effluent in an amount of 36 b.p.h. comprised 4285 pounds per hour of $C_7$ straight chain hydrocarbon purge medium, 2376 pounds per hour of $C_{10}$–$C_{21}$ straight chain hydrocarbons and 2956 pounds per hour of $C_{10}$–$C_{21}$ non-straight chain hydrocarbons. The purge effluent is passed through a cooler accumulator to reduce the temperature and pressure of the effluent to 130° F. and 2.5 p.s.i.g. and then introduced into the fresh feed line as supplemental feed thereto and returned to the adsorption vessel on the next adsorption cycle.

After the purge with n-heptane for at least about 2.5 minutes, the purge stream of light desorbing medium and the flow of purge effluent from the adsorption zone are discontinued. Next a flow of n-decane heavy desorption medium is introduced into the selective adsorbent vessel. However, the effluent line from the selective adsorbent vessel remains blocked. The flow of the n-decane heavy desorption medium into the selective adsorbent vessel is continued with the effluent line blocked until the pressure in the selective adsorbent vessel has increased to a value of about 40 p.s.i.g., which takes about 0.5 minute.

At the conclusion of the repressuring step the desorption effluent line is opened and the introduction of the heavy desorbent into the selective adsorbent vessel is continued in a direction countercurrent (downflow) to the direction of the fresh feed flow stream thereto, a vaporized stream of desorbing medium comprising a normal decane desorbent in an amount of 129,967 pounds per hour of normal decane (99% by weight). A desorption effluent stream which is composed of 2167 pounds per hour of normal heptane desorbent, 128,882 pounds per hour of desorbed $C_{10}$–$C_{21}$ straight chain hydrocarbons and 2622 pounds per hour of $C_{10}$–$C_{21}$ non-straight chain hydrocarbons is recovered from the other end of the selective adsorbent vessel in the desorption step at the rate of 519 b.p.h. The desorption effluent is fractionated for the recovery of n-heptane and n-decane desorbents and isolation of $C_{10}$–$C_{21}$ straight chain hydrocarbon product of 98% purity.

After the n-decane desorption step is completed, n-heptane vapor is charged at the rate of 339 b.p.h. downflow through the sieve bed at 630° F., and 30–40 p.s.i.g. to desorb the n-decane. The effluent from this step of 56,834 pounds per hour of n-heptane and 25,713 pounds per hour of n-decane is sent to a splitter wherein the n-heptane is separated from the n-decane. At the end of this step, the sieve bed is loaded with n-heptane, and the cycle may be repeated beginning with charging of fresh feed and purge recycle to the sieve bed.

Example II

A hydrotreated gas oil fraction having a boiling range of 565–670° F. an average carbon number of 19 and containing 14.8 weight percent of straight chain hydrocarbons is fed at the rate of 2,836.2 grams/cycle together with 519.1 grams/cycle of a purge recycle stream containing 15.6% by wt. of feed straight chain hydrocarbons, 11.6% by weight of feed non-straight chain hydrocarbons and 72.8% by weight of light desorbing medium having an average carbon number of 11 to the lower end of an adsorption vessel maintained at 675° F. and 5 p.s.i.g. and measuring 29.5 inches in length by 6 inches in diameter having an internal volume of 12,500 cubic centimeters which is preloaded with 9,900 grams of $\frac{1}{16}$ inch extruded molecular sieve selective adsorbent sold under the trade name Linde 5A–45 molecular sieve.

There is recovered from the other end of the vessel an adsorption effluent at the rate of 3095.5 grams/cycle composed of 687.7 grams/cycle, representing 22.2 weight percent of the light straight chain hydrocarbon desorbing medium and 2407.8 grams/cycle of non-straight chain hydrocarbon components. After a 35 minute adsorption step the adsorption vessel is depressured to a pressure of 0 p.s.i.g. and, in a purge step, a stream of light desorbing medium is passed through the adsorption zone in a direction countercurrent to the feed flow during adsorption step at a flow rate of 443.4 grams/cycle while maintaining the adsorption vessel at about 675° F. The effluent from the purge step in an amount of 519.1 grams/cycle and composed of 15.6 weight percent straight chain hydrocarbons and 11.6 weight percent non-straight chain hydrocarbons of the feed, the balance (72.8 weight percent) light desorbing medium, after cooling and pressure reduction, is mixed with fresh feed to the adsorption vessel. The purge step is discontinued and the adsorption vessel repressured to a pressure of 10 p.s.i.g. The time cycle for the depressure and purge steps is 3 minutes.

In the first desorption step, heavy desorbing medium having an average carbon number of 16 and composed principally of straight chain hydrocarbons is passed at a LHSV of 2.0 in the gaseous state and at a temperature of 675° F. countercurrently to the flow of fresh mixed feed stream through the adsorption vessel at a rate of 2741.3 grams/cycle. There is recovered a heavy desorption effluent at a rate of 2786.2 grams/cycle composed of 15.1 weight percent of desorbed straight chain hydrocarbons and 0.3 weight percent non-straight chain hydrocarbons of the fresh feed, 2.4 weight percent of light desorbing medium straight chain hydrocarbons and 82.2 weight percent of heavy desorbing medium. The first desorption step is discontinued when about 75% of the absorbed straight chain components of the fresh feed are removed from the sieve pores. The repressuring and first desorption steps require 17 minutes. In the second desorption step light desorbing medium comprising straight chain hydrocarbons having an average carbon number of 11 in the vapor state and a space velocity of 2.0 LHSV is passed countercurrently to the flow of the mixed feed through the adsorption vessel at a flow rate of 2393.8 grams/cycle. There is recovered at light desorption effluent at at rate of 2533 grams/cycle composed of 17.7 weight percent heavy desorbing medium straight chain hydrocarbons (average carbon number 16) and 82.3 weight percent light desorbing medium straight chain hydrocarbons (average carbon number 11). The $C_{16}$ straight chain desorption step requires 15 minutes. The total cycle time is 70 minutes. The straight chain hydrocarbon components of the fresh feed are recovered on a 100% basis and the purity is 98% or more. The sieve utilization (pound) of straight chain hydrocarbons per day per pound of sieve is 0.872.

For comparison purposes, the same feed stock is processed under same operating conditions of temperature, pressure, etc. using a single desorbing medium, i.e. a desorbing medium of straight chain hydrocarbons having an average carbon number of 11. The adsorption step requires 111 minutes, the depressure-purge steps a total of 3 minutes and combined repressuring and desorption 108 minutes, for a total cycle time of 222 minutes. The sieve utilization rate is 0.275.

It is to be noted that the method of the present invention requires about ⅓ of the processing time of the single desorption process (one hour 10 minutes versus 3 hours 42 minutes) and that the sieve utilization rate is 308% more effective than the single desorption process cycle (0.872 against 0.275).

The following tables illustrate the advantages of the method of the present invention on a variety of charge stocks containing varying carbon chain lengths.

TABLE I

A $C_{14}$–$C_{19}$ petroleum fraction with an average carbon number of 18 for the straight chain hydrocarbons, desorbent space velocity LHSV of 1.8 and desorbing 80% of the adsorbed feed component straight chain hydrocarbons.

| Heavy Desorbing Medium | Heavy Desorption Time (min.) | Light Desorbing Medium | Light Desorption Time (min.) | Total Desorption Time (min.) |
|---|---|---|---|---|
| $C_{11}$ | 72 | | | 72 |
| $C_{14}$ | 28 | $C_{11}$ | 12 | 40 |
| $C_{15}$ | 22 | $C_{11}$ | 15 | 37 |
| $C_{16}$ | 18 | $C_{11}$ | 22 | 40 |

Use of $C_{15}$ and $C_{11}$ in the two desorbent method reduces desorption time 48.7% compared to the use of $C_{11}$ desorbing medium alone.

TABLE II

A $C_{14}$–$C_{19}$ petroleum fraction with the average carbon number of 16.5 for the straight chain hydrocarbon component, desorbent space velocity LHSV of 0.6, and desorbing 70% of adsorbed feed component straight chain hydrocarbons.

| Heavy Desorbing Medium | Heavy Desorption Time (min.) | Light Desorbing Medium | Light Desorption Time (min.) | Total Desorption Time (min.) |
|---|---|---|---|---|
| $C_{11}$ | 49 | | | 49 |
| $C_{13}$ | 28 | $C_{11}$ | 12 | 40 |
| $C_{14}$ | 22 | $C_{11}$ | 15 | 37 |
| $C_{15}$ | 18 | $C_{11}$ | 22 | 40 |

Use of $C_{14}$ and $C_{11}$ in the two desorbent method reduces the desorption time by 24.5% compared to the use of $C_{11}$ desorbing medium alone.

TABLE III

A $C_{15}$–$C_{20}$ petroleum fraction having an average carbon number of 17 for the straight chain hydrocarbons, desorbent space velocity, LHSV of 1.8 and desorbing 70% of the adsorbed feed component straight chain hydrocarbons.

| Heavy Desorbing Medium | Heavy Desorption Time (min.) | Light Desorbing Medium | Light Desorption Time (min.) | Total Desorption Time (min.) |
|---|---|---|---|---|
| $C_{11}$ | 25 | | | 25 |
| $C_{15}$ | 9 | $C_{11}$ | 9 | 18 |
| $C_{16}$ | 7 | $C_{11}$ | 14 | 21 |

Use of $C_{15}$ and $C_{11}$ in the two desorbent method reduces the desorption time by 28% compared to the use of $C_{11}$ desorbing medium alone.

Obviously, many modifications and variations of the invention as hereinbefore set forth may be made without departing from the spirit and scope thereof and therefore only such limitations should be imposed as are indicated in the appended claims.

I claim:

1. In a vapor phase method of separating $C_{10}$–$C_{24}$ straight chain hydrocarbons from a feed hydrocarbon mixture thereof with non-straight chain hydrocarbons using a molecular sieve selective adsorbent and wherein said method comprises an adsorption cycle and a desorption cycle, the improvement in said desorption cycle which comprises after terminating the adsorption cycle in a first step contacting the selective adsorbent containing the adsorbed $C_{10}$–$C_{24}$ straight chain hydrocarbon components of said feed hydrocarbon mixture with a first vaporized desorbing medium comprising mainly at least one straight chain hydrocarbon having a carbon number in the range of the first five carbon numbers of the feed to remove said adsorbed straight chain hydrocarbons from said selective adsorbent and concomitantly adsorb some of the straight chain hydrocarbon components of the desorbing medium, and in a second step contacting said selective adsorbent with a second desorbing medium comprising mainly a vaporized straight chain hydrocarbon having a carbon number in the range of 1 to 4 carbon atoms less than the lightest straight chain hydrocarbon component of said feed hydrocarbon mixture or of said first desorbing medium to remove the adsorbed straight chain hydrocarbons of the first desorbing medium from said selective adsorbent.

2. Method as claimed in claim 1 wherein following the adsorption cycle the selective adsorbent is contacted with a purge gas consisting essentially of at least one straight chain hydrocarbon having the same composition as the second desorbing medium to remove surface adsorbed materials from said selective adsorbent.

3. Method as claimed in claim 1 wherein the adsorption and desorption cycles are carried out at a temperature of about 575—700° F., the adsorption pressure is in the range of from about 5 to about 80 p.s.i.g. and the desorption pressure is at least 1 to 20 p.s.i.g. above the highest pressure used in the adsorption cycle.

4. Method as claimed in claim 1 wherein the hydrocarbon mixture comprises $C_{10}$–$C_{18}$ hydrocarbons, the first desorbing medium comprises mainly an admixture of $C_{10}$–$C_{11}$ straight chain hydrocarbons, and the second desorbing medium is a mixture of $C_7$ and $C_8$ straight chain hydrocarbons.

5. Method as claimed in claim 1 wherein the hydrocarbon mixture comprises $C_{10}$–$C_{18}$ hydrocarbons, the first desorbing medium consists essentially of a $C_{10}$ hydrocarbon, and the second desorbing medium consists essentially of a $C_7$ hydrocarbon or $C_8$ hydrocarbon or a mixture thereof.

6. Method of desorbing $C_{20}$–$C_{24}$ straight chain hydrocarbons from a molecular sieve selective adsorbent containing said straight chain hydrocarbons adsorbed in the pores thereof which comprises in a first step contacting said selective adsorbent at an elevated temperature and pressure with a vaporized desorbing medium to remove the adsorbed straight chain hydrocarbons and concomitantly adsorbing some of the desorbing medium in the pores of said selective adsorbent, said desorbing medium comprising a major amount of at least one straight chain hydrocarbon having a molecular weight in the range of from the molecular weight of the lightest straight chain hydrocarbon component of the adsorbed straight chain hydrocarbons up to about the molecular weight of the mid-boiling point temperature range of said adsorbed straight chain hydrocarbons, and in a second step removing the adsorbed desorbing medium by contacting said selective adsorbent with a vaporized straight chain hydrocarbon containing one to four carbon atoms less than the lightest adsorbed $C_{10}$–$C_{24}$ straight chain hydrocarbon or of the lightest straight chain hydrocarbon component of the adsorbed desorbing medium and adsorbing some of the vaporized straight chain hydrocarbon used to remove the adsorbed desorbing medium.

7. Method as claimed in claim 6 wherein before the said first step the selective adsorbent is contacted to remove surface adsorbed materials from said selective adsorbent with a purge gas consisting essentially of at least one straight chain hydrocarbon having the same composition as the vaporized straight chain hydrocarbon desorbing medium used in the second step.

8. Method as claimed in claim 6 wherein the desorption steps are carried out at a temperature of about 575–700° F. and the desorption pressures are from about 10 to about 100 p.s.i.g.

9. Method as claimed in claim 6 wherein the hydrocarbon mixture comprises $C_{10}$–$C_{18}$ hydrocarbons, the first desorbing medium comprises mainly an admixture of $C_{10}$–$C_{11}$ straight chain hydrocarbons, and the second desorbing medium is a $C_7$ or a $C_8$ straight chain hydrocarbon or a mixture thereof.

10. Method as claimed in claim 6 wherein the hydrocarbon mixture comprises $C_{10}$–$C_{18}$ hydrocarbons, the first desorbing medium consists essentially of a $C_{10}$ hydrocarcarbon, and the second desorbing medium consists essentially of a $C_7$ hydrocarbon or $C_8$ hydrocarbon or a mixture thereof.

11. A method for the preparation of a $C_{10}$–$C_{24}$ straight chain hydrocarbon product stream which comprises in combination introducing a vapor phase hydrocarbon mixture of $C_{10}$–$C_{24}$ straight chain and non-straight chain hydrocarbons into an adsorption zone at an elevated temperature and a superatmospheric pressure to effect adsorption of the straight chain hydrocarbon components by the molecular sieve selective adsorbent of Type 5A structure in said adsorption zone, withdrawing from the adsorption zone an adsorption effluent comprising the non-straight chain hydrocarbon components of the resulting treated hydrocarbon mixture, terminating the adsorption step, in a depressuring step, depressuring the adsorption zone to reduce the pressure therein to a pressure less than the pressure of the adsorption zone, discontinuing the depressuring step when the pressure in the adsorption zone is not below about atmospheric pressure, in a purge step introducing into the depressured adsorption zone in a direction countercurrent to the flow of said hydrocarbon mixture into said adsorption zone a purge stream having the same composition as the second desorbing medium hereinafter defined to remove surface adsorbed hydrocarbons of the hydrocarbon mixture from the depressured adsorption zone, terminating the purge step, repressuring the adsorption zone to a pressure greater than said adsorption pressure, terminating the repressuring step, in a first desorbing step contacting the selective adsorbent with a first vaporized desorbing medium comprising mainly at least one straight chain hydrocarbon having a carbon number in the range of the first five carbon numbers of the hydrocarbon mixture to remove said adsorbed straight chain hydrocarbons from said selective adsorbent and concomitantly to adsorb some of the straight chain hydrocarbon components of said first desorbing medium, recovering the resulting first desorption effluent, separating the $C_{10}$–$C_{24}$ straight chain hydrocarbons therefrom, terminating the first desorbing step, in a second desorption step contacting said selective adsorbent with a second vaporized desorbing medium comprising mainly a straight chain hydrocarbon having a carbon number in the range of one to four carbon atoms less than the lightest straight chain hydrocarbon component of said hydrocarbon mixture or said first desorbing medium to remove the adsorbed straight chain hydrocarbons of the first desorbing medium from said selective adsorbent, terminating the desorption step, depressuring said adsorption zone to the adsorption pressure, and repeating the cycle sequentially.

12. Method as claimed in claim 11 wherein the hydrocarbon mixture comprises $C_{10}$–$C_{18}$ hydrocarbons, the first desorbing medium comprises mainly an admixture of $C_{10}$–$C_{11}$ straight chain hydrocarbons, and the second desorbing medium is a mixture of $C_7$ and $C_8$ straight chain hydrocarbons.

13. Method as claimed in claim 11 wherein the hydrocarbon mixture comprises $C_{10}$–$C_{18}$ hydrocarbons, the first desorbing medium consists essentially of a $C_{10}$ hydrocarbon and the second desorbing medium consists essentially of a $C_7$ hydrocarbon or a $C_8$ hydrocarbon or a mixture thereof.

References Cited
UNITED STATES PATENTS

| | | | |
|---|---|---|---|
| 2,818,449 | 12/1957 | Christenson et al. | 260—676 |
| 2,921,970 | 1/1960 | Gilmore | 260—676 |
| 3,053,913 | 9/1962 | Norris | 260—676 |
| 3,160,581 | 12/1964 | Mattox et al. | 260—676 |
| 3,201,490 | 8/1965 | Lacey et al. | 260—676 |
| 3,268,440 | 8/1966 | Griesmer et al. | 208—310 |
| 3,291,725 | 12/1966 | Brodbeck | 208—310 |

DELBERT E. GANTZ, *Primary Examiner.*

HERBERT LEVINE, *Assistant Examiner.*

UNITED STATES PATENT OFFICE
CERTIFICATE OF CORRECTION

Patent No. 3,395,097                                          July 30, 1968

Charles A. Senn III

It is certified that error appears in the above identified patent and that said Letters Patent are hereby corrected as shown below:

Column 7, line 30, after "and" insert -- a --. Column 11, line 14, "at" should read -- a --; line 15, "at", second occurrence should read -- a --; line 46, "$C_{14}-C_{19}$" should read -- $C_{15}-C_{24}$ --; same line 46, "with" should read -- having --; line 64, "the" should read -- an --. Column 13, line 1, "$C_{20}-C_{24}$" should read -- $C_{10}-C_{24}$ --.

Signed and sealed this 10th day of February 1970.

(SEAL)
Attest:

Edward M. Fletcher, Jr.                          WILLIAM E. SCHUYLER, JR.
Attesting Officer                                       Commissioner of Patents